United States Patent
Jaffar et al.

(10) Patent No.: US 7,538,755 B2
(45) Date of Patent: May 26, 2009

(54) SYSTEM, METHOD AND APPARATUS USING ADDRESSABLE LIGHT SENSORS

(75) Inventors: Rizal Jaffar, Masjid Tanah (MY); Len-Li Kevin Lim, Taiping (MY); Joon-Chok Lee, Kuching (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 882 days.

(21) Appl. No.: 10/979,650

(22) Filed: Nov. 2, 2004

(65) Prior Publication Data

US 2006/0092018 A1 May 4, 2006

(51) Int. Cl.
*G09G 3/36* (2006.01)
(52) U.S. Cl. ............................ 345/102; 345/82; 345/87
(58) Field of Classification Search ............. 345/32–34, 345/39, 44–45, 48, 77, 81–84, 87–89, 102, 345/207, 690; 356/343–344
See application file for complete search history.

(56) References Cited

U.S. PATENT DOCUMENTS

| | | | |
|---|---|---|---|
| 4,618,254 A | 10/1986 | Therrien | |
| 6,122,042 A * | 9/2000 | Wunderman et al. | 356/73 |
| 2004/0008176 A1* | 1/2004 | Nuimura | 345/102 |
| 2006/0044299 A1* | 3/2006 | Wang et al. | 345/207 |
| 2007/0040774 A1* | 2/2007 | Lee et al. | 345/77 |

FOREIGN PATENT DOCUMENTS

| WO | WO03/023372 A1 | 3/2003 |
|---|---|---|
| WO | WO03/058184 A1 | 7/2003 |
| WO | WO2005/111977 A1 | 11/2005 |

OTHER PUBLICATIONS

Len-Li Kevin Lim, et al., "Method and Apparatus Using Liquid Crystal Light Valve to Filter Light Received by a Photodector", U.S. Appl. No. 10/961,601, filed Oct. 8, 2004.
Joon-Chok Lee, et al."Use of Plurality of Light Sensors to Regulate a Direct-Firing Backlight for a Display", U.S. Appl. No. 10/935,063, filed Sep. 7, 2004.

* cited by examiner

*Primary Examiner*—Richard Hjerpe
*Assistant Examiner*—Mansour M Said

(57) ABSTRACT

In one embodiment, a light measurement is acquired from each of a plurality of illumination zones. Each light measurement is digitized, and values derived from the digitized light measurements are stored, proximate to where the light measurements are acquired. The values derived from the digitized light measurements are then transmitted to a central control system, and light emitted by the illumination zones is regulated based on determinations made by the central control system. In some cases, the light measurements may be acquired and transmitted via a light sensor package having: a light sensor providing an analog output proportional to received light; an analog-to-digital converter to convert the analog output of the light sensor to a digital value; a memory to store a value derived from the digital value; and an addressable communication interface to transmit the stored value to an external control system.

11 Claims, 4 Drawing Sheets

SYSTEM, METHOD AND APPARATUS USING ADDRESSABLE LIGHT SENSORS

BACKGROUND

Illumination devices comprised of solid-state devices (e.g., light emitting diodes (LEDs) or laser diodes) can provide a long operating life and a mercury-free lighting means. If comprised of devices emitting different colors of light (e.g., red (R), green (G) and blue (B) LEDs), such displays can also provide a wide color gamut and a selectable color point (e.g., a selectable white point). However, solid-state illumination devices can also present a few difficulties. For example, the optical characteristics of LEDs vary with temperature, drive current and aging. LED optical characteristics can also vary from batch to batch within the same fabrication process. In applications where uniform light intensity and color is desired (e.g., in liquid crystal display (LCD) backlighting), one or more light sensors are typically used to measure the intensity, and sometimes color, of light emitted by a light source. The sensor's measurement(s) are then used to regulate the drive signals of the light source's elements, to thereby regulate the intensity and/or color of light emitted by the light source.

SUMMARY OF THE INVENTION

In one embodiment, a method for regulating the light emitted by a plurality of illumination zones comprises acquiring a light measurement from each illumination zone. Each light measurement is then digitized, and values derived from the digitized light measurements are stored, proximate to where the light measurements are acquired. The values derived from the digitized light measurements are then transmitted to a central control system. In response to the transmitted values, the light emitted by the illumination zones is regulated based on determinations made by the central control system.

In another embodiment, a light sensor package comprises a light sensor, an analog-to-digital converter, a memory, and an addressable communication interface. The light sensor provides an analog output proportional to received light. The analog-to-digital converter converts the analog output of the light sensor to a digital value. The memory is configured to store a value derived from the digital value. The addressable communication interface is configured to transmit the stored value to an external control system.

In yet another embodiment, apparatus comprises a plurality of illumination zones and a central control system. Each illumination zone comprises: a light sensor providing an analog output proportional to received light; an analog-to-digital converter to convert the analog output of the light sensor to a digital value; a memory to store a value derived from the digital value; and an addressable communication interface to transmit the stored value. The central control system 1) addresses the addressable communication interfaces of each illumination zone and obtains the values stored by each illumination zone, and 2) determine how to regulate the light emitted by the illumination zones.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
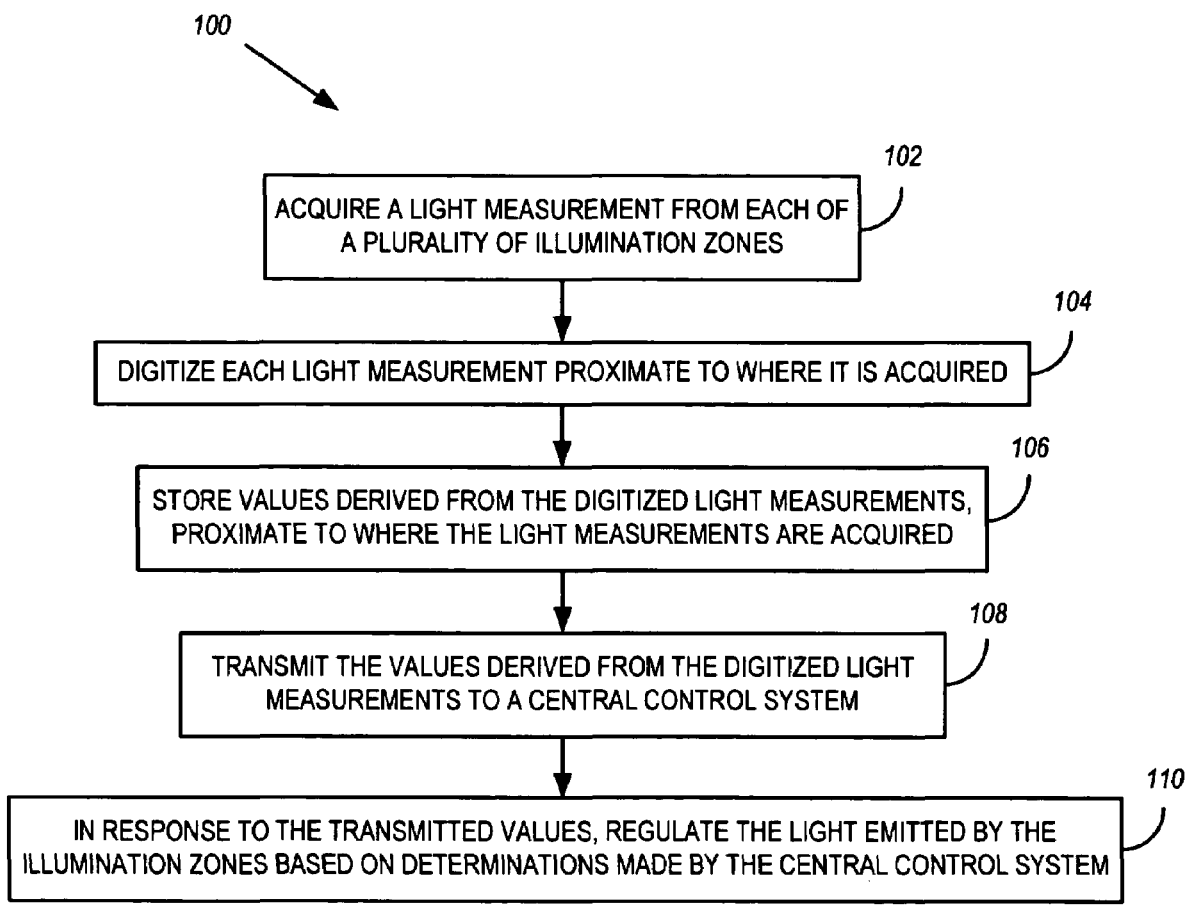
FIG. 1 illustrates an exemplary method for regulating light emitted by a plurality of illumination zones.
Figure 4:
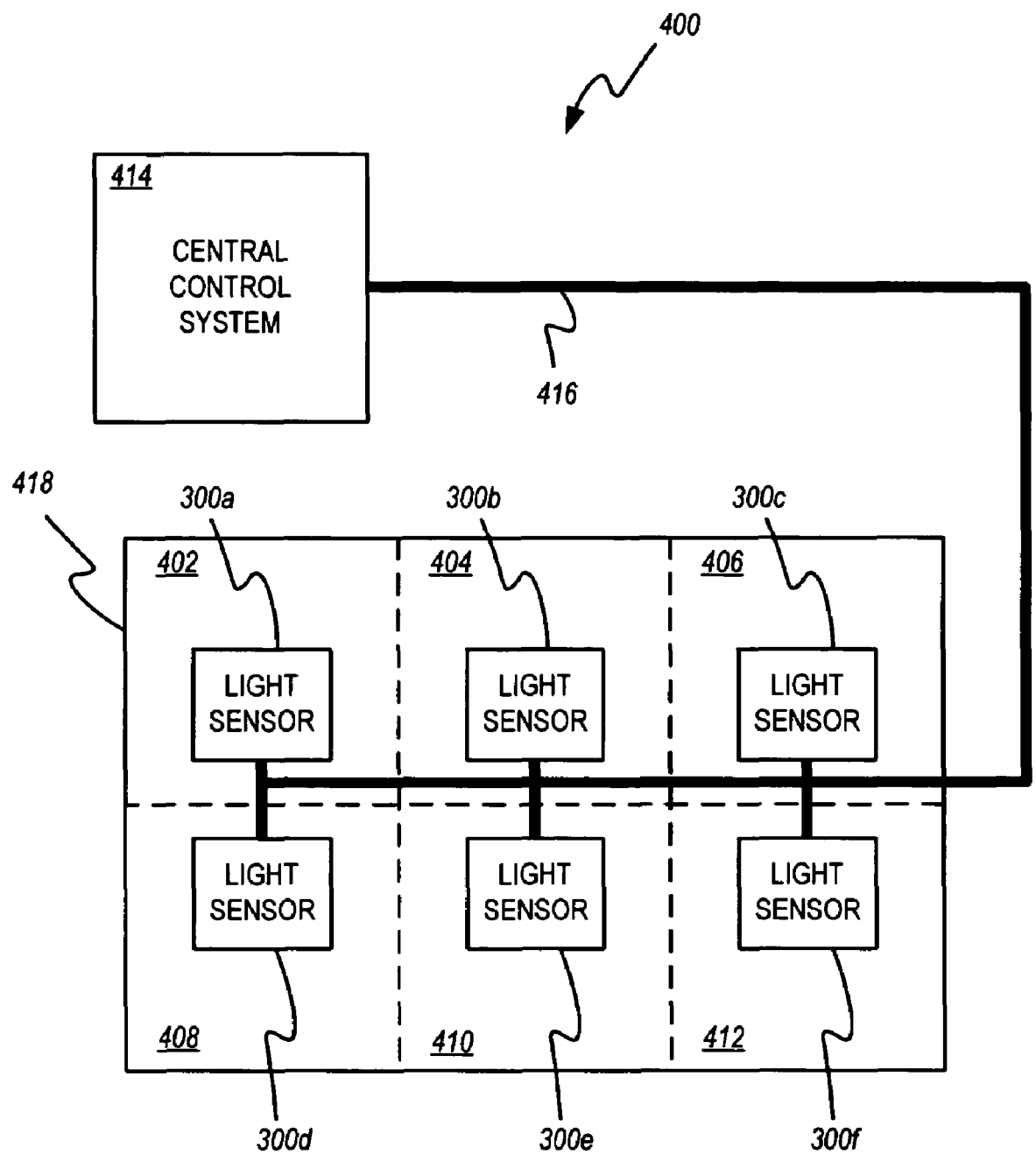
FIG. 4 illustrates an exemplary way to couple an array of the light sensor packages shown in FIG. 2 or 3 to a central control system.

FIG. 1 illustrates an exemplary method 100 for regulating the light emitted by a plurality of illumination zones (such as illumination zones 402-412 shown in FIG. 4). In accordance with the method 100, a light measurement is acquired 102 from each illumination zone 402-412. Each light measurement is then digitized 104, and values derived from the digitized light measurements are stored 106, proximate to where the light measurements are acquired. Values derived from the digitized light measurements are then transmitted 108 to a central control system 414, and light emitted by the illumination zones 402-412 is regulated 110 based on determinations made by the central control system 414.

Figure 2:
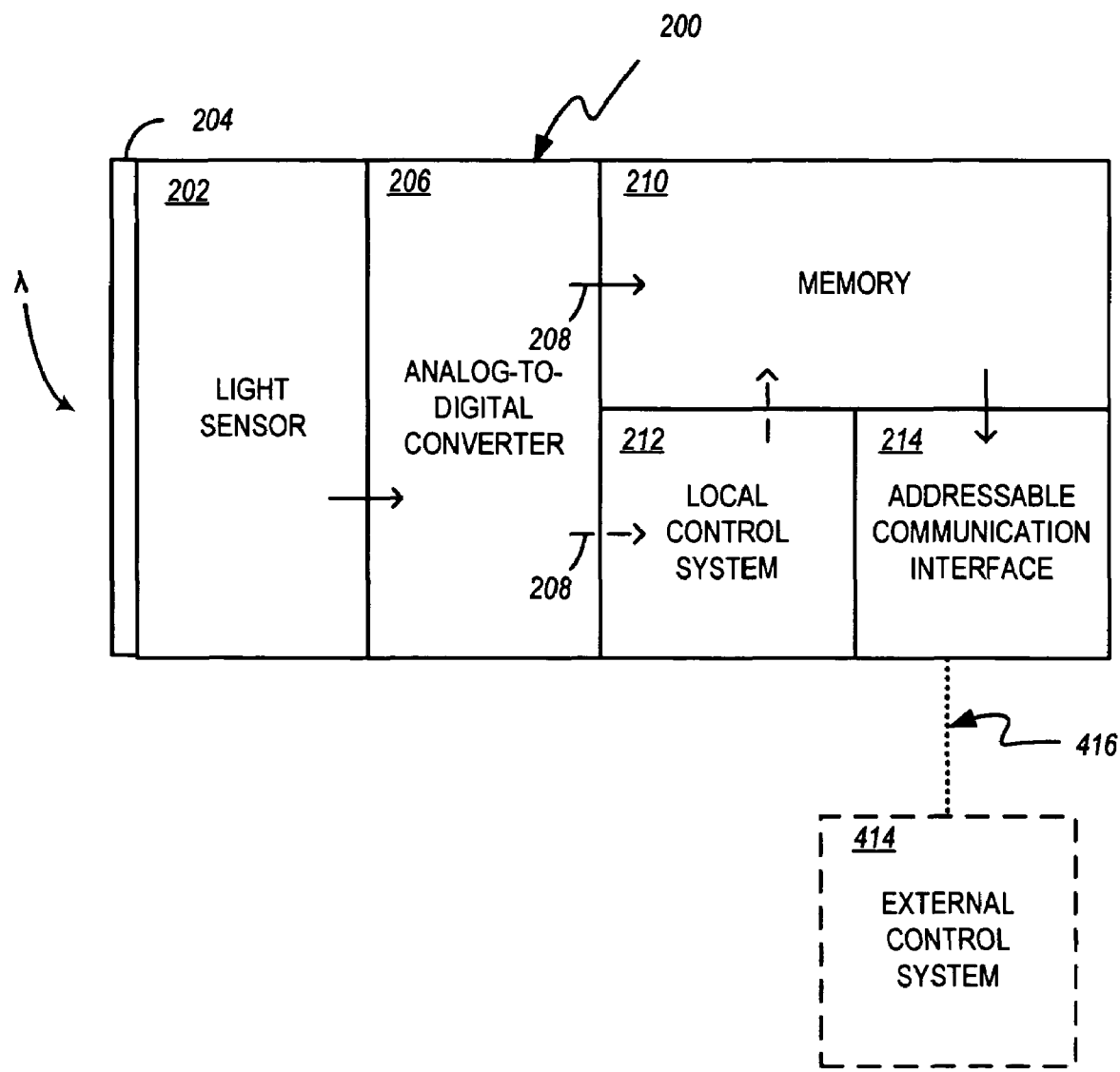
FIG. 2 illustrates a first exemplary light sensor package that could be used by the FIG. 1 method.

FIG. 2 illustrates a first exemplary light sensor package 200 that can be used by the method 100. By way of example, the light sensor package 200 can take the form of an integrated circuit (IC) package.

The package 200 comprises a light sensor 202 (e.g., a photodiode or phototransistor) that provides an analog output proportional to received light ($\lambda$). In some cases, the light sensor 202 may sample a broad spectrum of light (e.g., most or all visible light). In other cases, an optional filter 204 may be positioned over the light sensor 202 to limit the bandwidth of light sensed by the light sensor 202 (e.g., the filter 204 may only allow one or more wavelengths of red light to pass). The filter 204 may be variously implemented by, for example, painting it on the light sensor 202 or attaching it to the package 200.

The package 200 further comprises an analog-to-digital converter 206 that receives the output of the sensor 202 and converts it to a digital value 208. In one embodiment, this digital value 208 is then stored in a memory 210, which in some cases may take the form of an addressable register. In an alternate embodiment, the digital value 208 is manipulated by an optional local control system 212, and one or more outputs of the local control system 212 are stored in the memory 210 (denoted by the dashed path in FIG. 2). By way of example, the manipulations of the digital value 208 performed by the control system 212 may include averaging the digital value 208 with other values, trimming an offset (e.g., an ambient light offset) from the digital value 208, or increasing the gain of the digital value 208. In the claims, the values stored in memory 210 under both of these embodiments are referred to as "values derived from the digital value 208".

The package 200 also comprises an addressable communication interface 214 for transmitting the value (or values) stored in memory 210 to an external control system 414. In one embodiment, the addressable communication interface 214 may comprise a wired bus interface that may be physically connected to a bus 416. As defined herein, a "wired bus" includes both 1) a bus comprised of wire strands, and 2) a bus comprised of conductor traces on a printed circuit board (PCB). In another embodiment, the addressable communication may comprise a wireless interface.

In addition to (or instead of) manipulating the digital value 208, the local control system 212 may be configured to operate one or more of the light sensor 202, analog-to-digital converter 206, memory 210, or addressable communication interface 214. For example, the control system 212 may provide timing signals to each of these components 202, 206, 210, 214. Alternately, the control system 212 may provide a timing signal to only some of the components (e.g., the analog-to-digital converter 206), and other components may operate in an asynchronous manner (e.g., the light sensor 202 may continuously acquire light measurements), or may be operated by external stimuli received through the addressable communication interface 214. In one embodiment, the control system 212 is a clock circuit. In an alternate embodiment, the control system 212 is a microprocessor.

The control system 212 may also perform other functions, such as saturation detection for the light sensor 202.

The light sensor package 200 may operate in a variety of different ways, depending on how its components 202-214 are configured. For example, in one embodiment, the local control system 212 may be configured to 1) trigger operation of the analog-to-digital converter 206, and 2) output a stored value via the addressable communication interface 214, in response to a single command received at the addressable communication interface 214. In another embodiment, the control system 212 may be configured to 1) trigger operation of the analog-to-digital converter in response to a first command received at the addressable communication interface 214, and then 2) output a stored value in response to a second command received at the addressable communication interface 214.

As its name connotes, the addressable communication interface 214 may be addressed by an external control system 414 that transmits its address. In some cases, an external control system 414 may transmit the package's address, wait for a response, and then transmit a command. In other cases, an external control system 414 may transmit the interface's address along with a command. In still other cases, an external control system 414 may transmit a broadcast command, and the addressable communication interface 214 may then return one or more stored values along with its address (or, the interface 214 may return the stored value(s) in response to a second command that is addressed specifically to it).

As previously discussed, the light received by the sensor 202 may be filtered by a filter 204. As an alternative to the filter 204 being static, the filter 204 could be dynamic. That is, the filter 204 could alternately filter different wavelengths of light (e.g., red, then blue, then green). In some embodiments, the filter 204 could take the form of a color wheel or a liquid crystal light valve. The latter is described in the United States patent application of Lim, et al. entitled "Method and Apparatus Using Liquid Crystal Light Valve to Filter Light Received by a Photodector" Ser. No. 10/961,601, filed Oct. 8, 2004).

If the filter 204 is dynamic, then the analog-to-digital converter 206 may convert a series of sensor outputs to digital values, with all of the values being stored in the memory 210. Alternately, the control system 212 could combine the values output from the analog-to-digital converter 206 by, for example, averaging them or converting them to a single value that is indicative of a sensed light's color.

Figure 3:
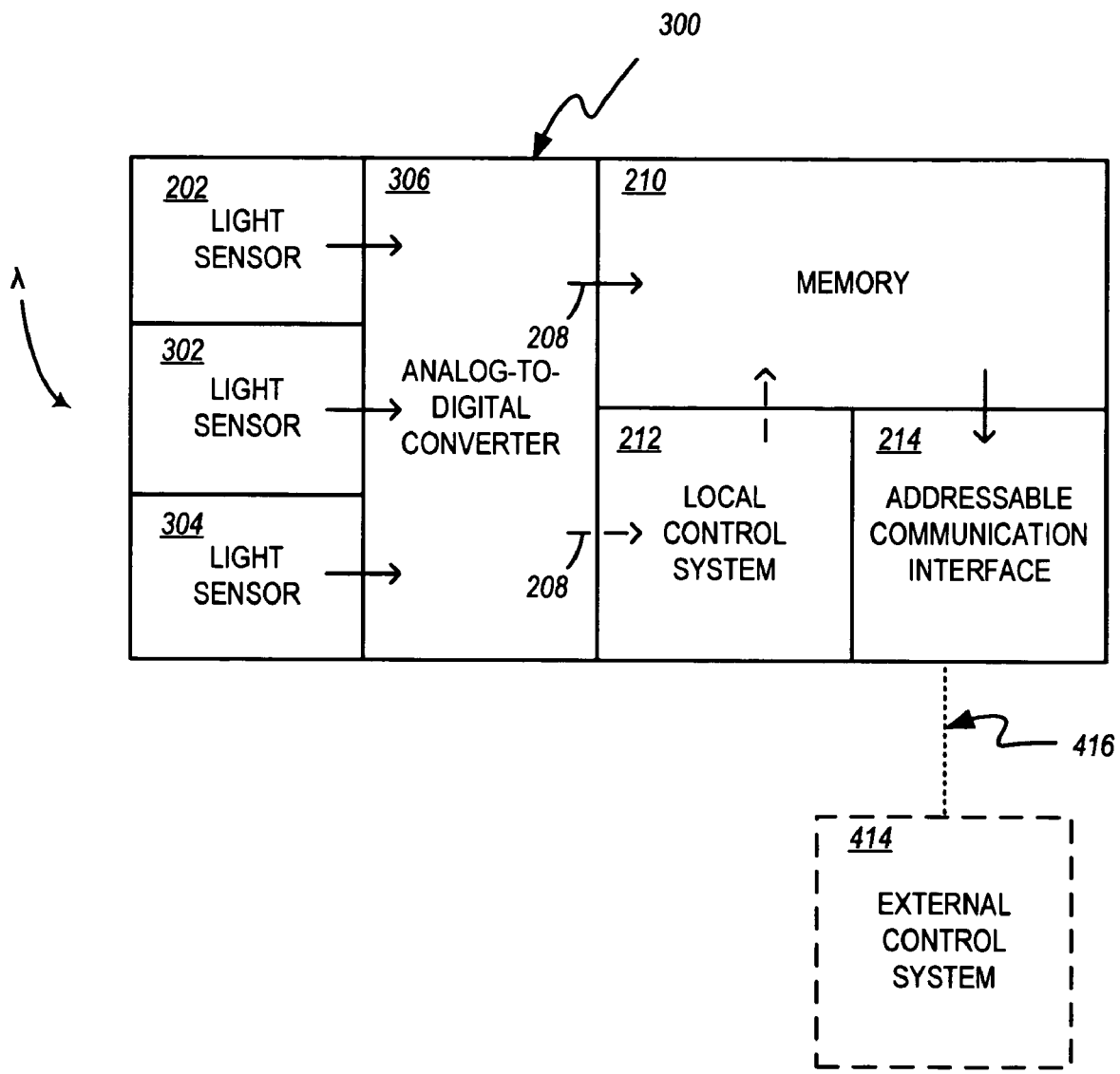
FIG. 3 illustrates a second exemplary light sensor package that could be used by the FIG. 1 method.

FIG. 3 illustrates a second exemplary light sensor package 300 that could be used by the method 100. The package 300 is similar to the package 200, but for the addition of at least one additional light sensor 302, 304. In this manner, instead of detecting the color of received light using a single, dynamically-filtered light sensor, the package 300 utilizes a plurality of light sensors 202, 302, 304, each of which is filtered to sense a different wavelength of light. The analog-to-digital converter 306 then multiplexes its receipt of the different sensor outputs, or comprises multiple parallel conversion blocks, to convert the output of each light sensor 202, 302, 304 to a digital value. These values may then be stored in the memory 210, or they may be manipulated by a control system 212 that provides one or more alternate values to store in the memory 210.

FIG. 4 illustrates an exemplary way 400 to couple a plurality of the light sensor packages shown in FIG. 2 or 3 (e.g., packages 300a-f to a central control system 414. As shown, a light source 418 may be divided into a plurality of illumination zones 402-412, with one of the light sensor packages 300a-f positioned within each zone 402412. Alternately, the components of the light sensor packages 300a-f need not be packaged, but may only be positioned in or proximate to each illumination zone 402-412.

The addressable communication interface associated with each illumination zone 402-412 may be coupled to a central control system 414 that 1) addresses the addressable communication interfaces of each illumination zone 402-412 to obtain their stored values, and 2) determines how to regulate the light emitted by the illumination zones 402-412. In one embodiment, the addressable communication interfaces of each zone 402-414 may be coupled to the control system 414 via a wired bus 416. In an alternate embodiment, the addressable communication interfaces and control system 414 may comprise wireless interfaces. The wired or wireless interfaces may implement a variety of different protocols, including Philips Semiconductor's I²C protocol, Motorola's Serial Peripheral Interface (SPI) protocol, or National Semiconductor's Microwire protocol.

Upon receipt of a single light intensity measurement from each of the illumination zones 402-412, the control system 414 may regulate the intensity of the light emitted by each illumination zone 402-412. However, if each illumination zone 402-412 comprises different-colored light sources (e.g., red, green and blue light emitting diodes), and if the control system 414 receives a plurality of light intensity measurements from each illumination zone 402-412 (e.g., measurements corresponding to the intensities of different wavelengths of light), then the control system 414 may regulate both the intensity and color of light emitted by each zone 402-412. The control system 414 may also regulate both the intensity and color of light emitted from each illumination zone 402-412 if the control system 414 receives other types of values that are indicative of light color (e.g., due to manipulation or processing of the sensor values obtained by each illumination zone 402-412).

The external control system 414 may regulate the light of each illumination zone 402-412 by, for example, generating pulse-width modulated (PWM) drive signals for regulating the light source or sources of each zone 402-412. In an alternate embodiment, the external control system 414 may instruct the control systems 212 of the light sensor packages 300a-f on how to regulate the light emitted from their corresponding illumination zones 402-412, and the control systems 212 may then regulate the light source or sources in their illumination zones 402-412 (e.g., by generating PWM drive signals).

By way of example, the light source 418 may take the form of an LED backlight for an LCD.

What is claimed is:

1. A light sensor package, comprising:
    a light sensor providing an analog output proportional to received light; an analog-to-digital converter to convert the analog output of the light sensor to a digital value;
    a memory to store a value derived from the digital value; and an addressable communication interface to transmit the stored value to an external control system;

at least one additional light sensor, each light sensor being filtered to sense a different wavelength of light, and each light sensor providing an analog output proportional to received light;

wherein the analog-to-digital converter converts the analog output of each light sensor to a digital value;

wherein the memory stores each of the digital values; and wherein the addressable communication interface is configured to send each of the stored values to the external control system.

2. The light sensor package of claim 1, further comprising a local control system to manipulate the digital value and derive the value stored in the memory.

3. The light sensor package of claim 2, wherein the local control system is a clock circuit.

4. The light sensor package of claim 1, further comprising a local control system configured to operate the light sensor, analog-to-digital converter, memory, and addressable communication interface.

5. The light sensor package of claim 1, further comprising a filter, positioned over the light sensor to limit the bandwidth of light sensed by the light sensor.

6. The light sensor package of claim 1, wherein the addressable communication interface is configured to i) receive a broadcast command from the external control system, and ii) return the stored value along with its address.

7. The light sensor package of claim 1, wherein the addressable communication interface comprises a wireless interface.

8. The light sensor package of claim 1, wherein the addressable communication interface comprises a wired bus interface.

9. A light sensor package, comprising:
a light sensor providing an analog output proportional to received light; an analog-to-digital converter to convert the analog output of the light sensor to a digital value;
a memory to store a value derived from the digital value; and
an addressable communication interface to transmit the stored value to an external control system;
at least one additional light sensor, each light sensor being filtered to sense a different wavelength of light, and each light sensor providing an analog output proportional to received light;
wherein the analog-to-digital converter converts the analog output of each light sensor to a digital value;
a local control system to manipulate the digital values and provide at least one value to store in the memory; and
wherein the addressable communication interface is configured to send the at least one stored value to the external control system.

10. Apparatus comprising:
plurality of illumination zones, each illumination zone comprising:
a light sensor providing an analog output proportional to received light;
an analog-to-digital converter to convert the analog output of the light sensor to a digital value;
a memory to store a value derived from the digital value; and
an addressable communication interface to transmit the stored value; and
a central control system to i) address the addressable communication interfaces of each illumination zone and obtain said stored values, and ii) determine how to regulate light emitted by the illumination zones;
wherein each illumination zone further comprises:
at least one additional light sensor, each light sensor being filtered to sense a different wavelength of light, and each light sensor providing an analog output proportional to received light;
wherein, in each illumination zone,
the analog-to-digital converter converts the analog output of each light sensor to a digital value;
the memory stores each of the digital values; and
the addressable communication interface is configured to transmit each of the stored values.

11. Apparatus, comprising:
a plurality of illumination zones, each illumination zone comprising:
a light sensor providing an analog output proportional to received light;
an analog-to-digital converter to convert the analog output of the light sensor to a digital value;
a memory to store a value derived from the digital value; and
an addressable communication interface to transmit the stored value; and
a central control system to i) address the addressable communication interfaces of each illumination zone and obtain said stored values, and ii) determine how to regulate light emitted by the illumination zones;
wherein each illumination zone further comprises:
at least one additional light sensor, each light sensor being filtered to sense a different wavelength of light, and each light sensor providing an analog output proportional to received light; and
a local control system;
wherein, in each illumination zone,
the analog-to-digital converter converts the analog output of each light sensor to a digital value;
the local control system manipulates the digital values and provides at least one value to store in the memory; and
the addressable communication interface is configured to send the at least one stored value to the central control system.

* * * * *

UNITED STATES PATENT AND TRADEMARK OFFICE
CERTIFICATE OF CORRECTION

PATENT NO. : 7,538,755 B2
APPLICATION NO. : 10/979650
DATED : May 26, 2009
INVENTOR(S) : Rizal Jaffar et al.

It is certified that error appears in the above-identified patent and that said Letters Patent is hereby corrected as shown below:

Column 5, Line 14, Claim 2, delete "value" and insert --values--.

Column 5, Line 15, Claim 2, delete "value" and insert --values--.

Column 5, Line 19, Claim 4, delete "sensor," and insert --sensors,--.

Column 5, Line 23, Claim 5, before "filter" delete "a".

Column 5, Line 23, Claim 5, delete "filter," and insert --filters,--.

Column 5, Line 23, Claim 5, delete "sensor" and insert --sensors--.

Column 5, Line 24, Claim 5, delete "sensor." and insert --sensors.--.

Column 5, Line 54, Claim 10, delete "Apparatus" and insert --Apparatus,--.

Column 5, Line 55, Claim 10, before "plurality" insert --a--.

Signed and Sealed this
Twenty-fifth Day of September, 2012

David J. Kappos
*Director of the United States Patent and Trademark Office*